United States Patent
Jalilian et al.

(10) Patent No.: US 10,584,960 B2
(45) Date of Patent: Mar. 10, 2020

(54) METHOD AND SYSTEM FOR DETERMINING WHETHER AN EVENT HAS OCCURRED FROM DYNAMIC STRAIN MEASUREMENTS

(71) Applicant: Hifi Engineering Inc., Calgary (CA)

(72) Inventors: Seyed Ehsan Jalilian, Calgary (CA); John Hull, Calgary (CA); Daniel Huang, Calgary (CA); Adekunle Adeyemi, Calgary (CA)

(73) Assignee: Hifi Engineering Inc., Calgary, Alberta (CA)

( * ) Notice: Subject to any disclaimer, the term of this patent is extended or adjusted under 35 U.S.C. 154(b) by 0 days.

(21) Appl. No.: 16/081,850

(22) PCT Filed: Mar. 1, 2016

(86) PCT No.: PCT/CA2016/050217
§ 371 (c)(1),
(2) Date: Aug. 31, 2018

(87) PCT Pub. No.: WO2017/147679
PCT Pub. Date: Sep. 8, 2017

(65) Prior Publication Data
US 2019/0072379 A1 Mar. 7, 2019

(51) Int. Cl.
| | |
|---|---|
| *G01B 11/16* | (2006.01) |
| *G01L 1/24* | (2006.01) |
| *G01M 3/00* | (2006.01) |
| *G01M 3/24* | (2006.01) |
| *G01M 3/38* | (2006.01) |
| *G01D 5/353* | (2006.01) |
| *G01K 11/32* | (2006.01) |

(Continued)

(52) U.S. Cl.
CPC .............. *G01B 11/18* (2013.01); *G01L 1/246* (2013.01); *G01B 21/32* (2013.01); *G01D 5/35316* (2013.01); *G01H 9/006* (2013.01); *G01K 11/3206* (2013.01); *G01M 3/002* (2013.01); *G01M 3/243* (2013.01); *G01M 3/38* (2013.01)

(58) Field of Classification Search
None
See application file for complete search history.

(56) References Cited

U.S. PATENT DOCUMENTS

| | | |
|---|---|---|
| 5,493,390 A | 2/1996 | Varasi et al. |
| 5,945,665 A | 8/1999 | Hay |

(Continued)

OTHER PUBLICATIONS

International Search Report and Written Opinion of the International Searching Authority, dated Nov. 24, 2016, for corresponding International Application No. PCT/CA2016/050217, 8 pages.

*Primary Examiner* — Jerry Rahll
(74) *Attorney, Agent, or Firm* — Klarquist Sparkman, LLP

(57) ABSTRACT

Methods, systems, and techniques for determining whether an event has occurred from dynamic strain measurements involve determining, using a processor, at least one event parameter from a signal representing the dynamic strain measurements, and then having the processor use the at least one event parameter to determine whether the event has occurred. The at least one event parameter is any one or more of a measure of magnitude of the signal, frequency centroid of the signal, filtered baseline of the signal, harmonic power of the signal, and time-integrated spectrum flux of the signal.

23 Claims, 8 Drawing Sheets

(51) Int. Cl.
  *G01B 21/32* (2006.01)
  *G01H 9/00* (2006.01)

(56) References Cited

U.S. PATENT DOCUMENTS

| | | |
|---|---|---|
| 9,605,537 B2 | 3/2017 | Hull et al. |
| 2009/0217769 A1 | 9/2009 | Roberts |

METHOD AND SYSTEM FOR DETERMINING WHETHER AN EVENT HAS OCCURRED FROM DYNAMIC STRAIN MEASUREMENTS

CROSS REFERENCE TO RELATED APPLICATION

This is the U.S. National Stage of International Application No. PCT/CA2016/050217, filed Mar. 1, 2016.

TECHNICAL FIELD

The present disclosure is directed at methods, systems, and techniques for determining whether an event has occurred from dynamic strain measurements.

BACKGROUND

In the oil and gas industry it may be desirable to monitor the dynamic strain experienced by a piece of equipment, such as a pipeline or a vessel, or by a well, in order to monitor the state of that equipment or well. For example, monitoring the dynamic strain experienced by a pipeline may permit an operator to detect whether the pipeline has a leak. Analogously, monitoring the dynamic strain within the well may permit an operator to determine insights regarding well integrity, such as whether casing vent flow or gas migration is affecting the well.

SUMMARY

According to a first aspect, there is provided a method for determining whether an event has occurred from dynamic strain measurements. The method comprises determining, using a processor, at least one event parameter from a signal representing the dynamic strain measurements, wherein the at least one event parameter is selected from the group comprising a measure of magnitude of the signal, frequency centroid of the signal, filtered baseline of the signal, harmonic power of the signal, and time-integrated spectrum flux of the signal; and using the at least one event parameter, using the processor to determine whether the event has occurred.

The event may be selected from the group comprising a leak in a conduit, a pipeline intrusion, a strain event, and a thermal event.

The method may further comprise obtaining the signal by optically interrogating an optical fiber comprising a pair of fiber Bragg gratings tuned to substantially identical center wavelengths, wherein the dynamic strain measurements comprise a strain measurement obtained along a fiber segment between the pair of fiber Bragg gratings.

The method may further comprise dividing the signal into event threshold windows, and determining the at least one event parameter may be performed on a per event threshold window basis.

The measure of magnitude of the signal may be the root-mean-square ("RMS") value of the signal, and the processor may determine the RMS value as $\sqrt{x_1^2+x_2^2+x_3^2+...+x_N^2}$, wherein the event threshold window comprises N samples of the signal, $x_n$ is the magnitude at sample n, and $1 \leq n \leq N$.

The processor may determine the frequency centroid as $$\frac{\sum_{n=0}^{N-1} f_n \cdot x_n}{\sum_{n=0}^{N-1} x_n},$$

wherein $f_n$ is the frequency of the signal at sample n, $x_n$ is the magnitude of the frequency component at sample n, and the event threshold window comprises N samples of the signal.

The processor may determine multiple frequency centroids for each of the event threshold windows, and each of the frequency centroids may be determined for a different frequency band.

The processor may determine the filtered baseline for each of the event threshold windows by filtering a first portion of the signal contained within the event threshold window to generate a filtered portion of the signal; and averaging the filtered portion of the signal over time.

The first portion of the signal may be all of the signal contained within the event threshold window, and wherein the time over which the first filtered portion is averaged may be the duration of the event threshold window.

The processor may filter the first portion of the signal using a bandpass filter having a passband of between approximately 0.001 Hz and approximately 10 Hz.

The processor may filter the first portion of the signal using a bandpass filter having a passband of between approximately 10 Hz and approximately 20 Hz.

The processor may determine the harmonic power for each of the event threshold windows by determining a first frequency domain representation of a second portion of the signal contained within the event threshold window to generate a first frequency domain representation of the signal; identifying a first set of peaks in the first frequency domain representation of the signal; identifying a second set of peaks in the first frequency domain representation of the signal, wherein the peaks comprising the second set are a subset of the first set and are integer multiples of each other; and summing total power of the second set of peaks to determine the harmonic power identified by the frequency of the peak of the second set having the lowest frequency.

The processor may identify as the first set of peaks all peaks in the first frequency domain representation of the signal.

The processor may identify as the first set of peaks only sharp peaks in the first frequency domain representation of the signal, wherein the processor determines whether a peak at a particular frequency is a sharp peak by determining a magnitude of the peak at the particular frequency; determining an average value of frequency magnitudes at one or more neighboring frequencies; comparing the magnitude of the peak at the particular frequency to the average value of frequency magnitudes; and identifying the peak at the particular frequency as a sharp peak when the magnitude of the peak at the particular frequency exceeds the average value of frequency magnitudes by a sharp peak threshold.

The neighboring frequencies may symmetrically surround the particular frequency.

The processor may identify as the first set of peaks a subset of all peaks in the first frequency domain representation of the signal, the subset comprising the N most powerful peaks, where N is less than a total number of the peaks in the first set.

The method may further comprise, prior to identifying the first or second set of peaks, using the processor to apply a moving average or median filter to smooth the signal.

The processor may determine the time-integrated spectral flux for each of the event windows by determining a second frequency domain representation of a third portion of the signal contained within the event threshold window to generate a second frequency domain representation of the signal; identifying N most powerful harmonics in the second frequency domain representation, wherein N is an integer less than a total number of harmonics in the PSD representation; removing the N most power harmonics in the second frequency domain representation of the signal to generate a post-harmonic frequency domain representation; and determining the time-integrated spectral flux as a summation of a spectral flux of the post-harmonic frequency domain representation.

The processor may determine the post-harmonic frequency domain representation $F_i = \Sigma_{j=1}^{N}(P_{ij} - P_{ij-1})^2$, wherein each of the event threshold windows is divided into time slices and, for any one of the event threshold windows, i represents each of the time slices, $F_i$ is the flux of the $i^{th}$ time splice, and $P_i$ and $P_{i-1}$ represent the power spectral density vectors of the $i^{th}$ and i−1 time slices, N represents a number of frequency bands over which the flux is determined.

N may equal $$\frac{f_{max} - f_{min}}{\Delta f},$$

wherein $f_{max}$ is at most the maximum frequency present in a Fourier Transform of the signal, $f_{min}$ is at lowest a minimum frequency present in the Fourier Transform of the signal, and $\Delta f$ is a frequency resolution used to determine vectors of the second frequency domain representation.

The processor may determines whether the event has occurred by, for each of the event threshold windows, comparing each of the at least one event parameter to an event parameter threshold specific to each of the at least one event parameter; determining a percent activity for each of an event parameter window comprising at least one of the event threshold windows, wherein the percent activity is a percentage of the event threshold windows in the event parameter window for which each of the at least one event parameters satisfies the event parameter threshold; comparing the percent activity to an activity threshold; and when the percent activity satisfies the activity threshold, determining that the event has occurred for the portion of the signal in the event parameter window.

According to another aspect, there is provided a system for determining whether an event has occurred from dynamic strain measurements. The system comprises an optical fiber comprising a pair of fiber Bragg gratings tuned to substantially identical center wavelengths, wherein the dynamic strain measurements comprise a strain measurement obtained along a fiber segment between the pair of fiber Bragg gratings; an optical interrogator optically coupled to the optical fiber and configured to optically interrogate the fiber Bragg gratings and to output an electrical signal representing the dynamic strain measurements; and a signal processing unit. The signal processing unit comprises a processor communicatively coupled to the optical interrogator; and a non-transitory computer readable medium communicatively coupled to the processor, wherein the medium has program code stored thereon that is executable by the processor and that, when executed by the processor, causes the processor to perform the method of any of the foregoing aspects or suitable combinations thereof.

The system may further comprise a display communicatively coupled to the processor, and the program code may further cause the processor to display, on the display, an indication of whether the event has occurred.

According to another aspect, there is provided a non-transitory computer readable medium having encoded thereon program code that is executable by a processor and that, when executed by the processor, causes the processor to perform the method of any of the foregoing aspects or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

When using dynamic strain measurements to determine whether an event, such as a pipeline leak, has occurred, it may be desirable to distinguish between different types of events that generate different types of dynamic strain readings. For example, when the equipment being monitored is a buried oil pipeline, it may be any one or more of a leak in that pipeline, a truck driving on the land over that pipeline, and a pump operating near the pipeline that impart dynamic strain on that pipeline. However, of the three events, it may only be the leak that requires immediate attention. Similarly, when monitoring a well, it may be one or both of pumping equipment and an instance of casing vent flow that generate dynamic strain measurements. Again, while the casing vent flow may require remediation, the standard operation of pumping equipment would not.

Figure 1A:
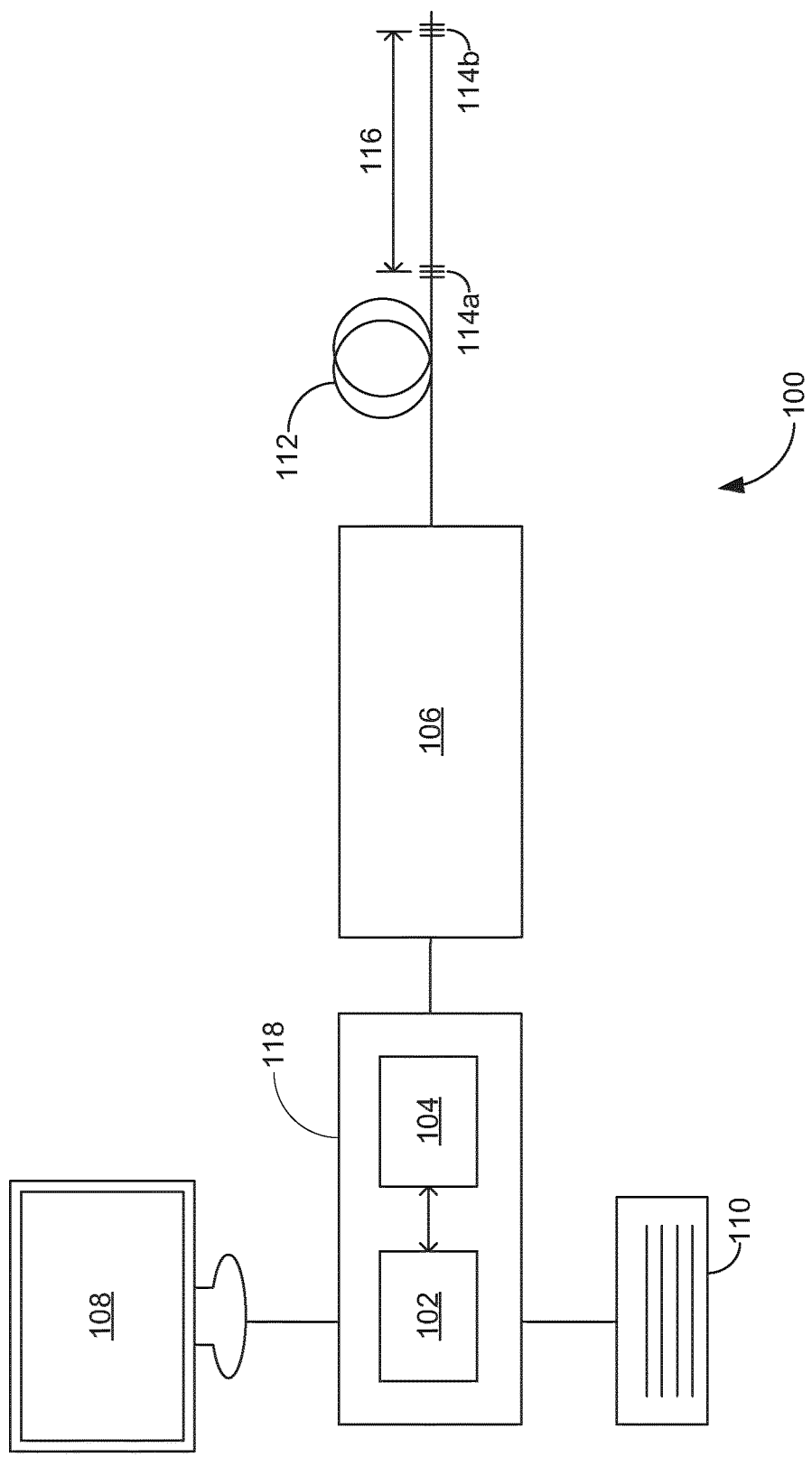
FIG. 1A is a block diagram of a system for determining whether an event has occurred from dynamic strain measurements, which includes an optical fiber with fiber Bragg gratings ("FBGs") for reflecting a light pulse, according to one example embodiment.
Figure 1B:
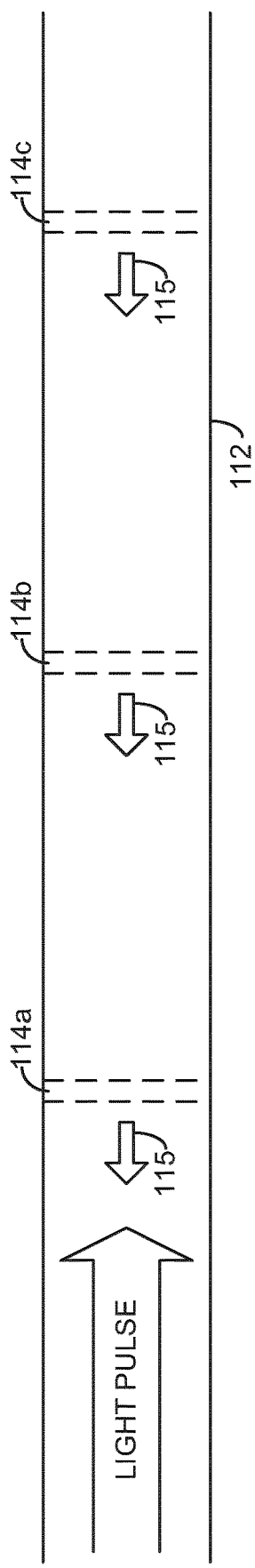
FIG. 1B is a schematic that depicts how the FBGs reflect a light pulse.
Figure 1C:
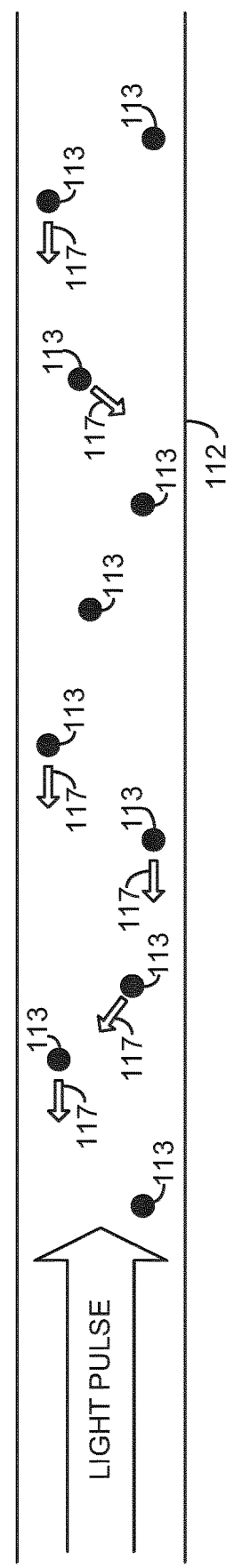
FIG. 1C is a schematic that depicts how a light pulse interacts with impurities in an optical fiber that results in scattered laser light due to Rayleigh scattering, which is used for distributed acoustic sensing ("DAS").

The embodiments described herein are directed at methods, systems, and techniques for distinguishing between and identifying events based on dynamic strain measurements. As used herein, "dynamic strain", refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 µHz, is referred to as "sub-Hz strain"; as used herein, a reference to "about" or "approximately" a number or to being "substantially" equal to a number means being within +/−10% of that number. Optical interferometry using fiber Bragg gratings ("FBGs"), as described in further detail with respect to FIGS. 1A-1C, is used to measure dynamic strain as applied to a fiber segment extending between any pair of the FBGs tuned to reflect an identical or substantially identical center wavelength. In some of the embodiments described herein, various parameters are extracted from the dynamic strain measurements and from those parameters a computer determines whether a particular event, such as whether a pipeline leak, has occurred. In certain embodiments, the computer determines which events have occurred even if the dynamic strain measurements for each of those events overlap in time.

Referring now to FIG. 1A, there is shown one embodiment of a system 100 for fiber optic sensing using optical fiber interferometry. The system 100 comprises an optical fiber 112, an interrogator 106 optically coupled to the optical fiber 112, and a signal processing device (controller) 118 that is communicative with the interrogator 106. While not shown in FIG. 1A, within the interrogator 106 are an optical source, optical receiver, and an optical circulator. The optical circulator directs light pulses from the optical source to the optical fiber 112 and directs light pulses received by the interrogator 106 from the optical fiber 112 to the optical receiver.

The optical fiber 112 comprises one or more fiber optic strands, each of which is made from quartz glass (amorphous $SiO_2$). The fiber optic strands are doped with a rare earth compound (such as germanium, praseodymium, or erbium oxides) to alter their refractive indices, although in different embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and Infini-Cor® series multimode fibers.

The interrogator 106 generates sensing and reference pulses and outputs the reference pulse after the sensing pulse. The pulses are transmitted along optical fiber 112 that comprises a first pair of FBGs. The first pair of FBGs comprises first and second FBGs 114a,b (generally, "FBGs 114"). The first and second FBGs 114a,b are separated by a certain segment 116 of the optical fiber 112 ("fiber segment 116"). The length of the fiber segment 116 varies in response to an event (such as a strain event) that the optical fiber 112 experiences. Each fiber segment 116 between any pair of adjacent FBGs 114 with substantially identical center wavelengths is referred to as a "channel" of the system 200.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in different embodiments (not depicted) any number of FBGs 114 may be on the fiber 112, and time division multiplexing ("TDM") (and optionally, wavelength division multiplexing ("WDM")) may be used to simultaneously obtain measurements from them. If two or more pairs of FBGs 114 are used, any one of the pairs may be tuned to reflect a different center wavelength than any other of the pairs. Alternatively a group of multiple FBGs 114 may be tuned to reflect a different center wavelength to another group of multiple FBGs 114 and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the optical source 101. When different pairs of the FBGs 114 are not tuned to different center wavelengths, TDM is sufficient.

The interrogator 106 emits laser light with a wavelength selected to be identical or sufficiently near the center wavelength of the FBGs 114 that each of the FBGs 114 partially reflects the light back towards the interrogator 106. The timing of the successively transmitted light pulses is such that the light pulses reflected by the first and second FBGs 114a,b interfere with each other at the interrogator 106, and the optical receiver 103 records the resulting interference signal. The event that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the event the fiber segment 116 is experiencing, which allows the interrogator 106 to estimate the magnitude of the event the fiber segment 116 experiences from the received optical power. The interrogator 106 digitizes the phase difference and outputs an electrical signal ("output signal") whose magnitude and frequency vary directly with the magnitude and frequency of the event the fiber segment 116 experiences.

The signal processing device (controller) 118 is communicatively coupled to the interrogator 106 to receive the output signal. The signal processing device 118 includes a processor 102 and a non-transitory computer readable medium 104 that are communicatively coupled to each other. An input device 110 and a display 108 interact with the processor 102. The computer readable medium 104 has encoded on it statements and instructions to cause the processor 102 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. The processor 102 may apply a low pass filter with a cutoff frequency of 20 Hz to the output signal to isolate the vibration portion of the output signal from the acoustics portion of the output signal. Analogously, to isolate the acoustics portion of the output signal from the vibration portion, the processor 102 may apply a high pass filter with a cutoff frequency of 20 Hz. The processor 102 may also apply more complex signal processing methods to the output signal; example methods include those described in PCT application PCT/CA2012/000018 (publication number WO 2013/102252), the entirety of which is hereby incorporated by reference.

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect an event along the fiber 112 occurring further from the optical source 101 than the second FBG 114b. For example, in the embodiment of FIG. 1B, a portion of the sensing pulse not reflected by the first and second FBGs 114a,b can reflect off the third FBG 114c and a portion of the reference pulse not reflected by the first FBG 114a can reflect off the second FBG 114b, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference (θ) is as follows:

$$\theta = \frac{2\pi nL}{\lambda} \quad (1)$$

where n is the index of refraction of the optical fiber; L is the optical path length of the fiber segment 116; and λ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, emitting energy or a thermal event.

One conventional way of determining ΔnL is by using what is broadly referred to as distributed acoustic sensing ("DAS"). DAS involves laying the fiber 112 through or near a region of interest and then sending a coherent laser pulse along the fiber 112. As shown in FIG. 1C, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the event experienced by the fiber during an interrogation time window, which is a proxy for the magnitude of the event, such as vibration or acoustics emanating from the region of interest. In contrast, the embodiments described herein measure events experienced by the fiber 112 using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of 2% or 5%. The use of FBG-based interferometry to measure interference causing events offers several advantages over DAS, in terms of optical performance.

Figure 2:
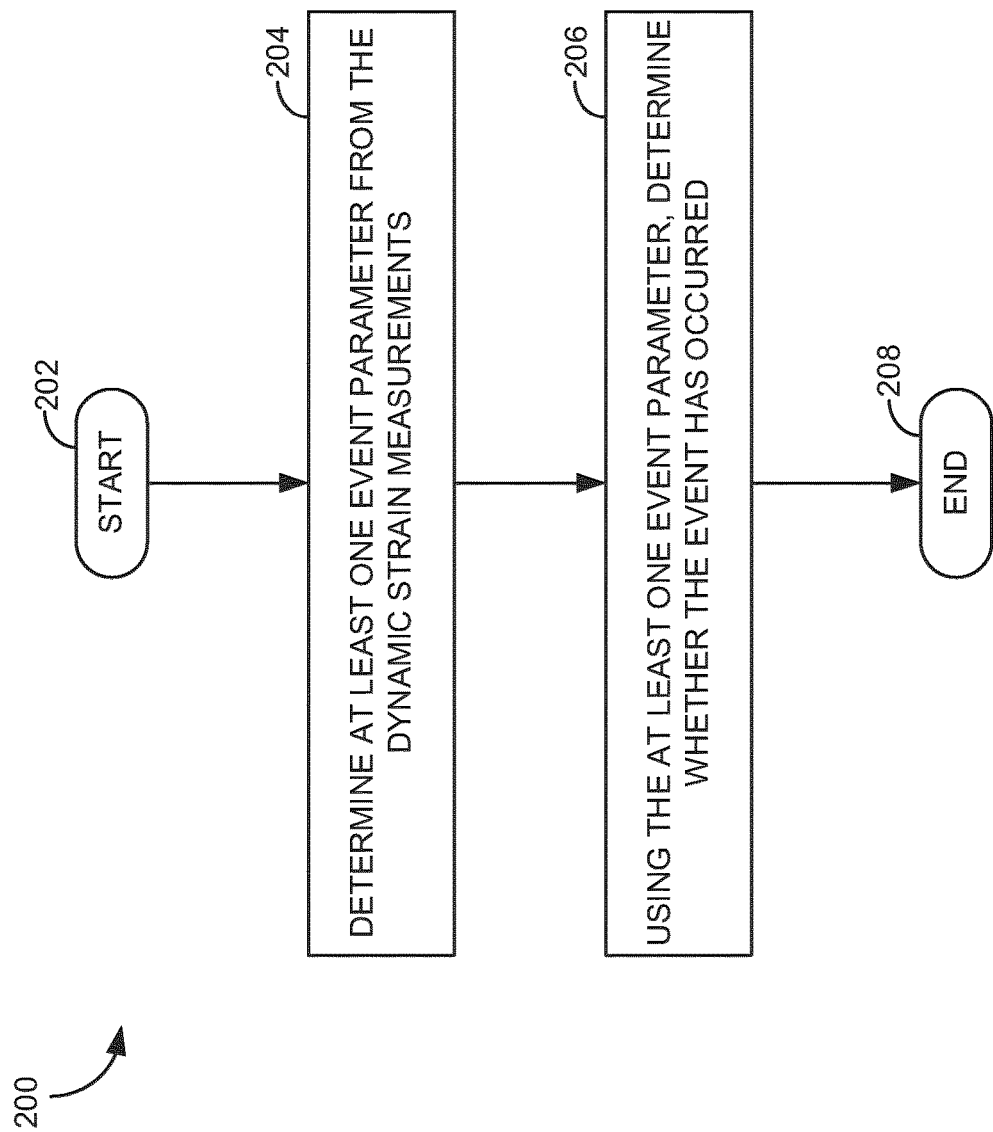
FIG. 2 is a flowchart of a method for determining whether an event has occurred from dynamic strain measurements, according to another example embodiment.

Referring now to FIG. 2, there is shown a flowchart of a method 200 for determining whether an event has occurred from dynamic strain measurements. The method 200 may be encoded as computer program code that is stored on a computer readable medium and that is executed by a computer 906, such as that shown in FIG. 9. The computer 906 begins performing the method 200 at block 202 and proceeds to block 204 where it determines at least one event parameter from dynamic strain measurements measured using the system 100 of FIG. 1A. In the depicted example embodiment, the different parameters that are mentioned are as follows, although in different embodiments (not depicted) any one or more of more, fewer, and different parameters may be used:

1. window timestamp;
2. a measure of magnitude of the signal;
3. frequency centroid;
4. filtered baseline;
5. harmonic power;
6. time-integrated spectrum flux; and
7. percent activity.

Figure 3A:
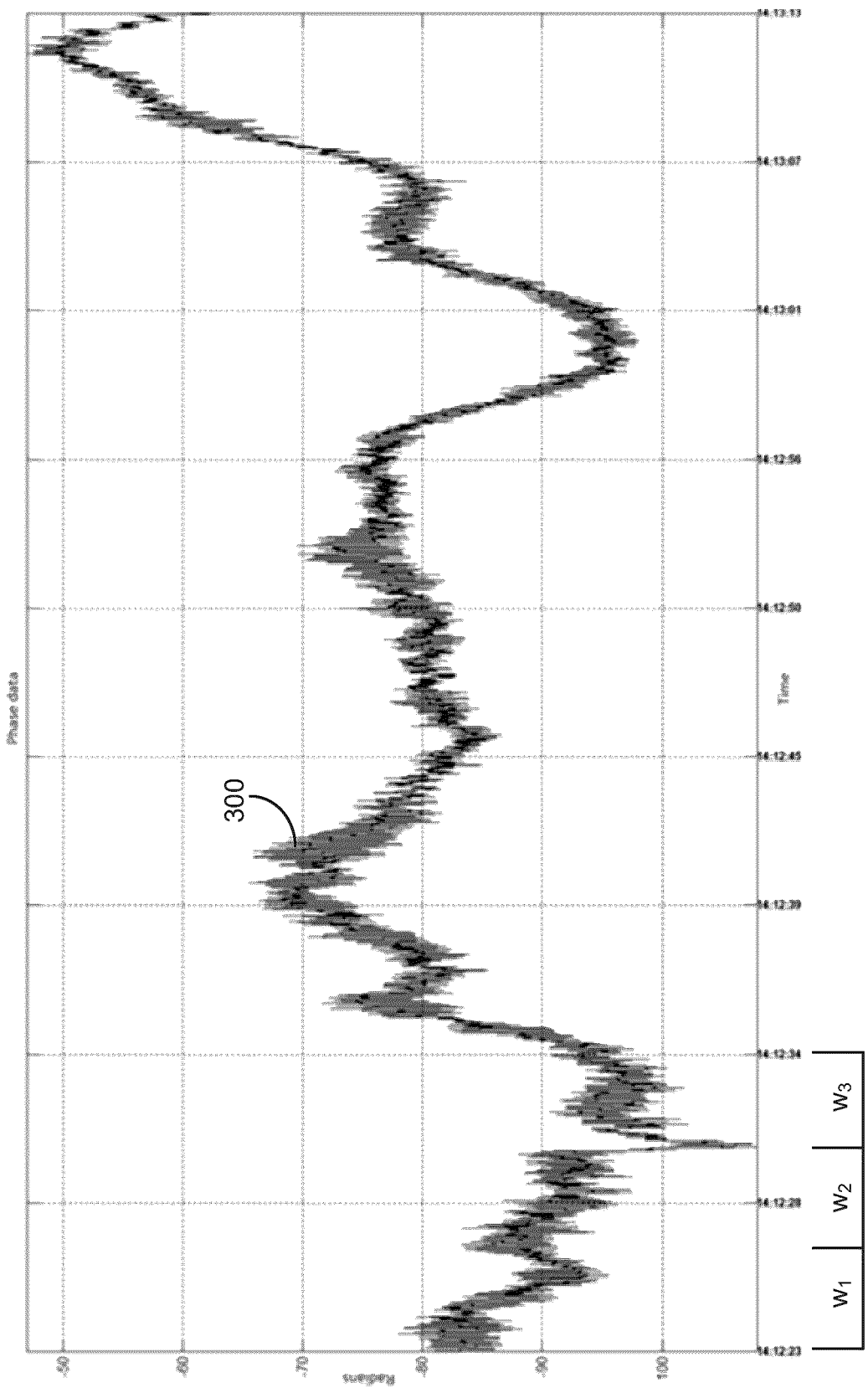
FIGS. 3A and 3B depict an example signal representing dynamic strain measurements acquired by the system of FIG. 1A, with FIG. 3A being unfiltered and FIG. 3B being filtered.
Figure 3B:
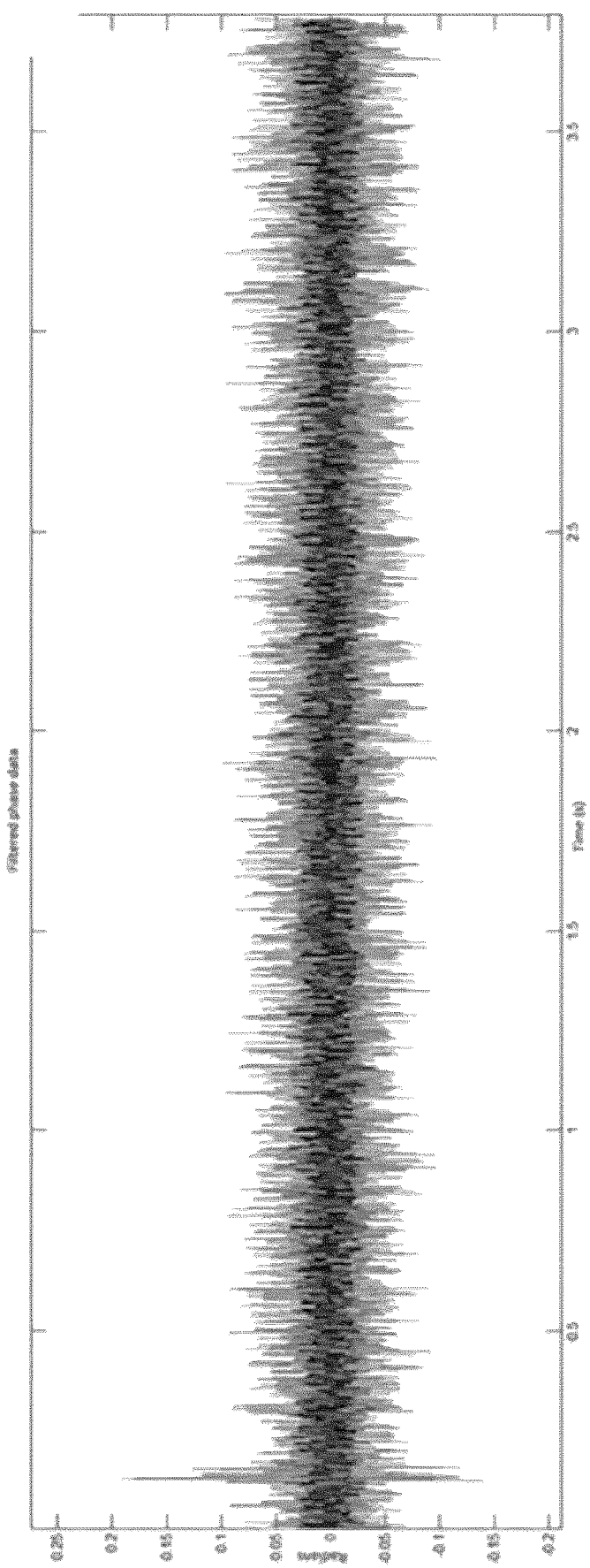

Referring now to FIGS. 3A and 3B, there is shown a signal 300 that represents dynamic strain measurements displayed to the user via the display 108. The signal 300 is generated from an electrical signal the interrogator 106 generates in response to light reflected from the FBGs 114 being incident on a photodiode comprising part of the interrogator 106. The photodiode generates an electrical signal in response to that incident light, which is digitized using an analog-to-digital converter, also comprising part of the interrogator 106, and which is then transmitted to the signal processing device 118 for display on the display 108. In an embodiment in which the signal processing unit 118 comprises a general purpose computer, the interrogator 106 and signal processing unit 118 may be communicatively coupled via Ethernet.

The signal 300 expresses phase measurements in radians, and FIGS. 3A and 3B accordingly show the signal 300 as radians over time; FIG. 3A shows the unfiltered version of the signal 300, while FIG. 3B shows a high pass filtered version of the signal 300. In the example embodiment, the high pass filter's cutoff frequency is 10 Hz, although in different embodiments (not depicted) one or both of different types of filters and different cutoff frequencies may be used. The processor 104 divides the signal 300 into event threshold windows $w_1 \ldots w_n$. To illustrate this, the signal 300 shown in FIG. 3 is divided into windows, with the first three windows $w_1 \ldots w_3$ being labeled. In the depicted example embodiment, the duration of each of the windows is constant at 0.1 seconds (the windows depicted in FIG. 3A are not drawn to scale) and is empirically determined, taking into account data storage limitations, although in different embodiments window duration may differ and may be user configurable. However, in a different embodiment (not depicted), the duration chosen for each of the windows may vary. For example, the duration chosen for each of the windows may be related to the cutoff frequency of the filters applied by the processor 102 used to condition the signal 300. For example, where the center frequency of a band pass filter used to condition the signal 300 is 2 kHz, a typical duration for each of the windows may be 10×(½ kHz)=0.005 s; this ensures that about 10 cycles of the desired frequency are processed in each window.

In general, the processor 102 determines the various parameters described above on a window-by-window basis. Example methods that the processor 102 performs in order to determine those parameters are described below.

Window Timestamp

The processor 102 applies a timestamp to each of the windows to correlate the portions of the signal 300 to the windows for those portions; applying timestamps to the windows permits the processor 102 to distinguish different windows from each other and to record the relative order of different windows. The processor 102 in this example embodiment uses the time corresponding to the beginning of each window as a timestamp, but in different embodiments the processor 102 may additionally or alternatively use the time corresponding to a different portion of each window as the timestamp.

Measure of Magnitude of the Signal

In the example embodiment below, the measure of magnitude of the signal is the root mean square ("RMS") value of the signal. However, in different embodiments (not depicted), the measure of magnitude of the signal may, for example, be the average value, peak value, or peak-to-peak value of the signal.

The processor 102 determines the RMS value of the portion of the signal 300 for each of the windows using Equation (2):

$$V_{RMS} = \sqrt{x_1^2 + x_2^2 + x_3^2 + \ldots + x_N^2} \quad (2)$$

where the window for which the RMS value is determined comprises n samples of the dynamic strain measurements and $x_N$ represents the magnitude of the signal 300 for the $N^{th}$ sample.

In an different embodiment (not depicted) in which the signal 300 comprises an analog instead of a digital signal, the processor 102 may determine the RMS value of the signal 300 contained within any one of the windows as the square root of the integral of the square of the signal 300 for that window.

In another different embodiment, the RMS value (regardless of whether the signal 300 is discrete or continuous) may be modified by a scalar value. For example, the processor 102 may divide the sum of squares in Equation (2) by N prior to taking the square root. Similarly, when the signal 300 is continuous, the processor 102 may divide the integral of the square of the signal 300 by the duration of the window prior to taking the integral.

Frequency Centroid

The processor 102 determines the frequency centroid of the portion of the signal 300 for each of the windows using Equation (3):

$$\text{Centroid} = \frac{\sum_{n=0}^{N-1} f_n \cdot x_n}{\sum_{n=0}^{N-1} x_n} \quad (3)$$

where $f_n$ is the frequency of the signal 300 at sample n, $x_n$ is the magnitude of the frequency component at sample n, and there are N samples of the signal 300 in the window. A Fast Fourier Transform ("FFT") may be used to determine the magnitude of the frequency components.

Additionally or alternatively, the processor 102 may determine more than one frequency centroid for a given time period (e.g., for a window). For example, the processor 102 may apply Equation (2) for any one or more of the windows for different frequency bands (e.g., one frequency centroid for 0 Hz-1,000 Hz, a second frequency centroid for 1,000 Hz-2,000 Hz, a third frequency centroid for 2,000 Hz-3,000 Hz, etc.). The frequency bands may or may not overlap (e.g., one frequency centroid for 0 Hz-1,500 Hz and a second frequency centroid for 1,000 Hz-2,500 Hz) and may or may not encompass all frequencies that occur during the time period (e.g., for a window in which frequencies are present from 0 Hz-3,000 Hz, there may be one frequency centroid for 0 Hz-1,500 Hz and a second frequency centroid for 2,000 Hz-3,000 Hz).

In a different embodiment (not depicted) in which the signal 300 comprises an analog instead of a digital signal, the processor 102 may replace $f_n$ with the continuous function $f(n)$, $x_n$ with the continuous function $x(n)$, and the summation from n=0 to n=N−1 may be replaced by the integral from n=0 to N.

In a further different embodiment, as with the RMS value, the frequency centroid (regardless of whether the signal 300 is discrete or continuous) may be modified by a scalar value.

Filtered Baseline

The processor 102 determines the filtered baseline of the portion of the signal 300 contained in each of the windows by performing a method comprising the following:

1. Applying a filter to filter out those aspects of the signal 300 conveying unwanted or unnecessary information; the filter is applied on a per window basis, and a filtered portion of the signal is consequently contained within each of the windows. The filters that the processor 102 applies depend on the information the processor 102 desires to obtain from the signal 300. For example, information relating to thermal changes and dynamic strain are found in overlapping frequencies, and in particular those frequencies that are generally less than the frequencies comprising acoustic signals. In this example embodiment, frequencies between about 0.001 Hz and about 10 Hz comprise data on thermal and dynamic strain effects, while frequencies between about 10 Hz and about 20 Hz comprise acoustic information; both of these frequency bands may be useful when detecting leaks in a pipeline, for example. The processor 102 accordingly applies filters to extract this information. For example, the processor 102 applies a high-pass filter with a cutoff frequency of between about 10 Hz and about 20 Hz, inclusively, in order to extract the acoustic information, and may apply a bandpass filter with a passband of between about 0.001 Hz to about 10 Hz to extract the thermal and strain information.

However, in different embodiments, different types of filters may be used; for example, only a high-pass filter may be used (e.g., only acoustic information may be filtered), or only a low-pass filter may be used (e.g., only low or ultra-low frequency information may be filtered). Furthermore, the cutoff frequencies for the filter or filters used may vary with the embodiment; for example, in another embodiment in which a bandpass filter is used to filter ultra-low frequency and acoustic information, the filter may have a passband of about 1 Hz<f<about 20 Hz.

2. After applying the filtering step described above, the processor 102 averages over time (e.g., over the duration of the window being analyzed) the values obtained using filtering to arrive at a single value that may be subsequently interpreted to determine whether that value is representative of any one or more of strain, temperature, or another parameter. For example, if the processor 102 has applied a bandpass filter of between about 0.001 Hz to about 10 Hz to obtain thermal and strain information from the signal 300, the processor 102 may subsequently determine the single value by integrating the signal 300 over the duration of the window and by then dividing the result of this integration by the duration of the window. In different embodiments, the average may be taken over a duration less than that of a single window (e.g., over a certain portion of the window).

Harmonic Power

Figure 4:
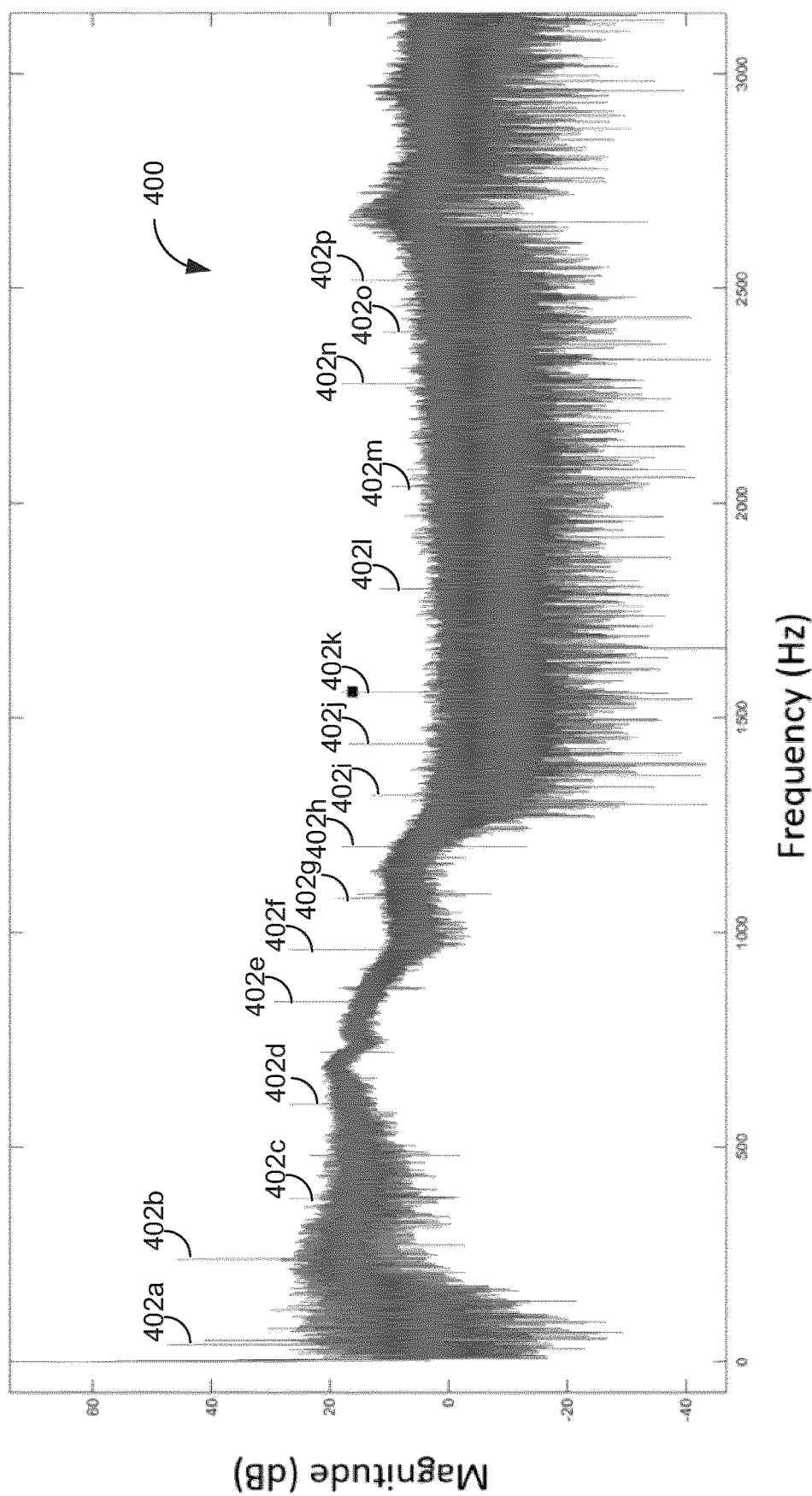
FIG. 4 is an example frequency domain representation of a portion of an unfiltered example signal representing dynamic strain measurements acquired by the system of FIG. 1A contained in one of the windows.

The processor 102 determines the harmonic power of the signal 300 for each of the windows by performing a method comprising the following:

1. Determining the frequency domain representation of the portion of the signal 300, in the form of the power spectral density ("PSD") of the signal, in the window being considered. For example, the processor 102 may perform an FFT on the portion of the signal 300 in each window. FIG. 4 shows an example frequency domain representation 400 of the portion of the signal 300 contained in one of the windows.

Detecting a first set of peaks comprising any peaks in the frequency domain representation of the signal 300. This may be done, for example, by identifying the sharp peaks in the frequency domain representation. A "sharp" peak is the magnitude of the frequency domain representation at a particular frequency ("peak frequency") that exceeds, by a certain sharp peak threshold, the average value of the frequency magnitudes at one or more neighboring frequencies. "Neighboring" frequency values may comprise frequency values within a certain range of frequencies higher and lower than the peak frequency. In one embodiment, the frequency range may be symmetrical about the peak frequency; alternatively, the frequency range may be asymmetrical about the peak frequency.

In a different embodiment (not depicted), the processor 102 may identify all peaks, and not only sharp peaks. Additionally or alternatively, the processor 102 may identify only the N most powerful peaks.

The frequency domain representation 400 of FIG. 4 shows sixteen example sharp peaks, labeled 402a . . . p, which the processor 102 may identify as described above.

2. After identifying the first set of peaks, the processor 102 identifies a second set of peaks comprising those peaks at frequencies that are integer multiples of each other (e.g., 60 Hz, 120 Hz, 180 Hz, 240 Hz, etc.). The processor 102 sums the total power of these peaks comprising the second set of peaks to determine the total power of the harmonic identified by the lowest peak frequency (e.g., the total power at the 60 Hz, 120 Hz, 180 Hz, 240 Hz, etc., harmonics is referred to as the power of the 60 Hz harmonics).

Additionally or alternatively, the processor 102 may also perform peak smoothing. In one example embodiment, the processor 102 may apply a moving average or median filter to smooth the peaks of the frequency domain representation 400. For example, in one embodiment, for each frequency of the frequency domain representation 400 the processor 102 selects the magnitude at that frequency and at a certain number of frequencies surrounding that frequency (e.g., magnitudes at the five frequencies immediately higher and lower than that frequency), sorts the magnitudes at those selected frequencies by magnitude, and averages a certain number of those magnitudes around the median value to determine an average magnitude for those selected frequencies. The processor 102 then uses that average magnitude as the magnitude for all of those selected frequencies.

Spectral Flux

The processor 102 determines the spectral flux of the signal 300 for each of the windows by performing a method comprising the following:

1. The processor 102 determines the frequency domain representation of the signal, in the form of the PSD for a certain duration of the signal 300 that includes the window for which the spectral flux is to be determined. For example, in one embodiment determining the PSD for five seconds of the signal at a resolution of 1 Hz is suitable.

2. As described above under the heading, "Harmonic Power", the processor 102 determines the peaks in the frequency domain representation 400 of the signal 300 that represent harmonics. The processor 102 then removes the most powerful N bands from consideration to reduce the contribution to total spectral power by those harmonics. N may be any suitable number in view of the number and strength of the harmonics present in the signal; for example, in one embodiment N may be selected to be twenty.

3. Once the processor 102 has removed the harmonics from the signal, it determines the post-harmonic spectral flux of the signal 300 using Equation (4):

$$F_i = \Sigma_{j=1}^{N}(P_{ij} - P_{ij-1})^2 \qquad (4)$$

where, for any one of the windows, i represents each time slice, $F_i$ is the flux of the $i^{th}$ time splice, and $P_i$ and $P_{i-1}$ represent the PSD vectors of the $i^{th}$ and i−1 time slices.

N represents the number of frequency bands over which the flux is determined according to Equation (5):

$$N = \frac{f_{max} - f_{min}}{\Delta f} \quad (5)$$

where $f_{max}$ and $f_{min}$ are user selected, with $f_{max}$ being, at most, the maximum frequency present in the Fourier Transform of the signal and with $f_{min}$ being, at lowest, the minimum frequency present in the Fourier Transform of the signal. In one example embodiment, $f_{min}$ is 0 Hz and $f_{max}$ is one half of the sampling frequency (e.g., when the sampling frequency is 6 kHz, $f_{max}$=3 kHz). In Equation (5), $\Delta f$ is the frequency resolution used to determine the PSD vectors.

Figure 5:
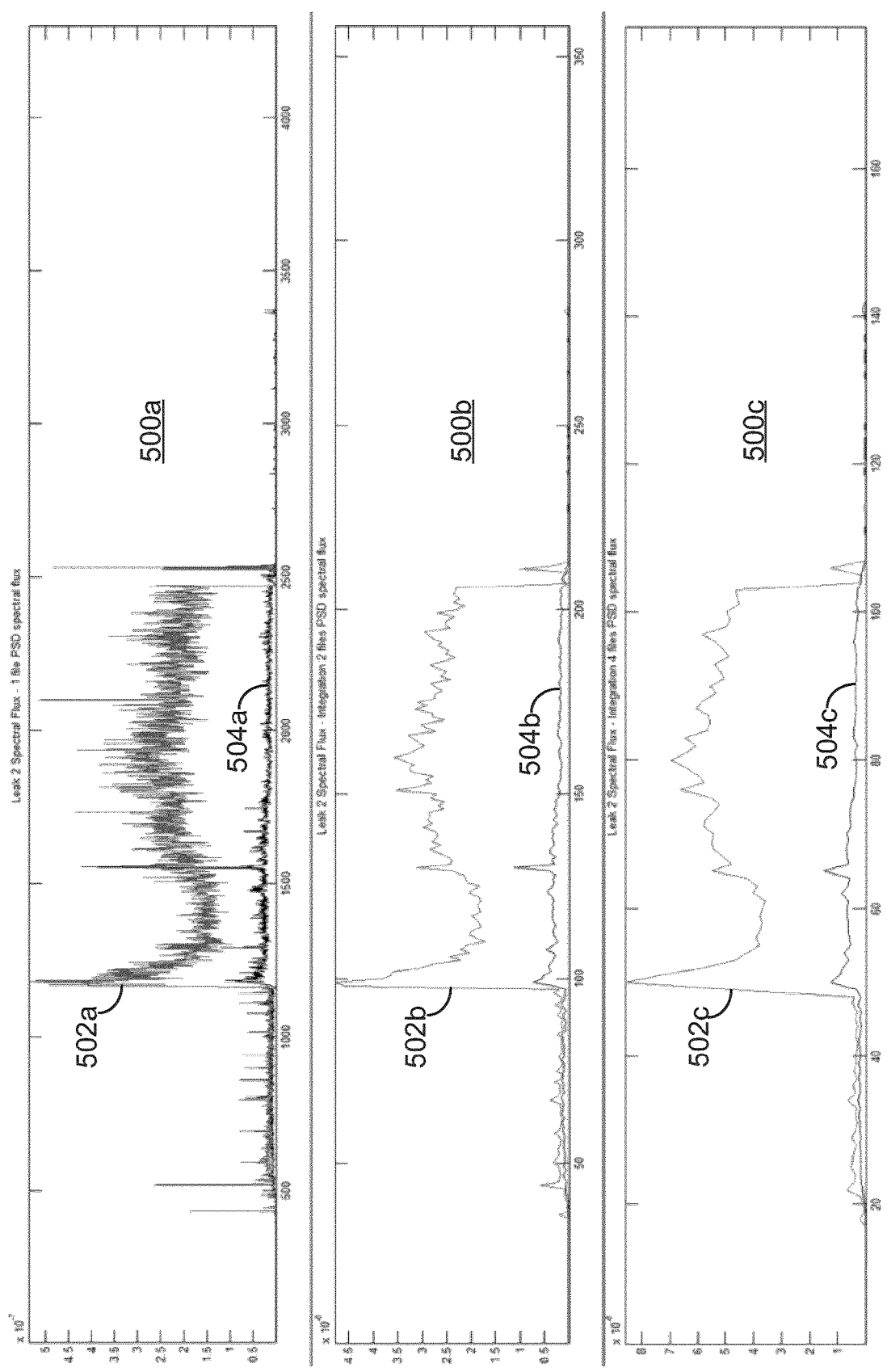
FIG. 5 shows three graphs of spectral flux, each averaged over a different time period, and generated using the dynamic strain measurements acquired by the system of FIG. 1A.

FIG. 5 shows first through third graphs 500a-c of spectral flux for a signal, each averaged over approximately 5 hours. The graphs 500a-c are of power density vs. frequency. The first graph 500a is generated using a window duration of 5 seconds, the second graph 500b is generated using a window duration of 8 seconds, and the third graph 500c is generated using a window duration of 16 seconds. Each of the graphs 500a-c comprise data from two channels: a first channel is used to generate a first set of power density curves 502a-c and a second channel is used to generate a second set of power density curves 504a-c, with the first channel experiencing more power spectral density flux than the second channel.

After the processor 102 determines the various event parameters, as described above, it generates a summary table of those event parameters. Table 1, below, is an example of a summary table comprising values of window timestamps and, for each window, the RMS value, frequency centroid, filtered baseline, harmonic power, and spectral flux ("PSD flux") for that window. In Table 1, each of the windows has a duration of approximately 0.1 seconds, and the units for the RMS Value, frequency centroid, filtered baseline, harmonic power, and PSD flux measurements are radians, Hz, radians, dB, and radians$^2$, respectively.

TABLE 1

Summary Table of Event Parameters

| Timestamp | RMS Value | Freq. Centroid | Filtered Baseline | Harmonic Power | PSD Flux |
|---|---|---|---|---|---|
| 08:30:07:270 | 0.0054 | 961.92 | 9.0506 | −169.0581 | 0.2821 |
| 08:30:07:370 | 0.0055 | 948.51 | 8.8822 | −158.7158 | 0.2821 |
| 08:30:07:469 | 0.0056 | 925.22 | 8.7136 | −168.4811 | 0.2821 |
| 08:30:07:569 | 0.0056 | 991.36 | 8.5578 | −141.7669 | 0.2821 |
| 08:30:07:669 | 0.0056 | 997.65 | 8.4197 | −159.531 | 0.2821 |
| 08:30:07:768 | 0.0057 | 1041.7 | 8.2782 | −162.9562 | 0.2821 |
| 08:30:07:868 | 0.0057 | 991.3 | 8.1669 | −176.8528 | 0.2351 |
| 08:30:07:967 | 0.0057 | 1039.6 | 8.1056 | −202.3256 | 0.2351 |
| 08:30:08:067 | 0.0057 | 1042.7 | 8.0867 | −163.9122 | 0.2351 |
| 08:30:08:167 | 0.0057 | 1007.1 | 8.0492 | −183.5098 | 0.2351 |
| 08:30:08:266 | 0.0058 | 965.85 | 7.9734 | −164.2402 | 0.2351 |
| 08:30:08:366 | 0.0057 | 1010.3 | 7.9094 | −154.5732 | 0.2351 |
| 08:30:08:466 | 0.0057 | 1029.4 | 7.8586 | −165.834 | 0.2587 |
| 08:30:08:565 | 0.0057 | 1006.3 | 7.8143 | −152.7006 | 0.2587 |
| 08:30:08:665 | 0.0057 | 1080.3 | 7.7566 | −165.391 | 0.2587 |
| 08:30:08:764 | 0.0058 | 1028.8 | 7.6863 | −181.479 | 0.2587 |
| 08:30:08:864 | 0.0057 | 1024.2 | 7.6309 | −206.3011 | 0.2587 |
| 08:30:08:964 | 0.0057 | 1046 | 7.6067 | −157.0737 | 0.2587 |
| 08:30:09:063 | 0.0058 | 1015.4 | 7.5503 | −189.3101 | 0.6754 |
| 08:30:09:163 | 0.0058 | 957.59 | 7.4373 | −151.9637 | 0.6754 |
| 08:30:09:262 | 0.0058 | 1050.6 | 7.3245 | −191.4795 | 0.6754 |
| 08:30:09:362 | 0.0059 | 1100.6 | 7.2501 | −166.2449 | 0.6754 |
| 08:30:09:462 | 0.006 | 1008.7 | 7.2376 | −177.3877 | 0.6754 |

TABLE 1-continued

Summary Table of Event Parameters

| Timestamp | RMS Value | Freq. Centroid | Filtered Baseline | Harmonic Power | PSD Flux |
|---|---|---|---|---|---|
| 08:30:09:561 | 0.0058 | 1004 | 7.2263 | −160.8419 | 0.6754 |
| 08:30:09:661 | 0.0059 | 1027.2 | 7.1801 | −185.9301 | 0.6649 |
| 08:30:09:760 | 0.0058 | 1004.9 | 7.0986 | −155.884 | 0.6649 |
| 08:30:09:860 | 0.0058 | 1023.9 | 7.0084 | −176.6711 | 0.6649 |
| 08:30:09:960 | 0.0057 | 1082.1 | 6.9716 | −154.5087 | 0.6649 |
| 08:30:10:059 | 0.0058 | 997.55 | 6.9812 | −180.3559 | 0.6649 |
| 08:30:10:159 | 0.0057 | 993.54 | 7.019 | −197.8535 | 0.6649 |
| 08:30:10:259 | 0.0056 | 1010.5 | 7.0186 | −168.8985 | 0.2116 |
| 08:30:10:358 | 0.0057 | 1019.9 | 6.9778 | −187.993 | 0.2116 |
| 08:30:10:458 | 0.006 | 985.22 | 6.9244 | −209.2119 | 0.2116 |
| 08:30:10:557 | 0.0056 | 991.64 | 6.89 | −168.2488 | 0.2116 |
| 08:30:10:657 | 0.0056 | 1036.4 | 6.8824 | −164.7414 | 0.2116 |
| 08:30:10:757 | 0.0056 | 1067.1 | 6.8685 | −155.8247 | 0.2116 |
| 08:30:10:856 | 0.0055 | 1025.1 | 6.8495 | −154.486 | 0.2116 |
| 08:30:10:956 | 0.0057 | 1040.7 | 6.8302 | −182.5829 | 0.2116 |
| 08:30:11:055 | 0.0055 | 1040.2 | 6.8619 | −165.421 | 0.2089 |
| 08:30:11:155 | 0.0055 | 1035.4 | 6.8401 | −154.2809 | 0.2089 |
| 08:30:11:255 | 0.0055 | 998.45 | 6.7968 | −177.9778 | 0.2089 |
| 08:30:11:354 | 0.0055 | 1036 | 6.7525 | −173.052 | 0.2089 |
| 08:30:11:454 | 0.0055 | 981.36 | 6.7088 | −166.2649 | 0.2089 |

Percent Activity

For each of the different events the processor 102 is able to detect, the processor 102 determines the percent activity of the signal 300 for each of the windows from the event parameters it has determined. The "percent activity" of a certain portion of the signal 300 refers to the percentage of time the event parameters for the signal 300 satisfy certain event parameter thresholds that define the occurrence of a particular event. For example, an event may be defined by an RMS value of at least 0.0060 radians, a frequency centroid of at least 1.10 kHz, a filtered baseline of at least 8.0 Hz, harmonic power of at least −200 dB, and PSD flux of at least 0.25 radians$^2$. If percent activity for a certain portion of the signal is 65%, then 65% of the time during that portion of the signal 300 the event parameters satisfy those thresholds that define that event. Before determining that an event has occurred as a result of analyzing a portion of the signal 300, the processor 102 compares the percent activity for that portion of the signal 300 to a percent activity threshold that specifies the minimum percent activity the processor 102 required to conclude that an event has occurred. For example, if percent activity is 65% and the percent activity threshold is 50%, the processor 102 determines that the event for which the percent activity is 65% has occurred. The percent activity threshold may be varied, with a higher threshold corresponding to a decreased rate of the processor 102 falsely identifying events having occurred.

For a certain portion of the signal 300 divided into a number of windows $w_n$ for each of which the processor 102 has already determined the event parameters, the processor 102 determines percent activity by performing a method comprising the following:

1. The processor 102 divides the portion of the signal 300 into a number of percent activity windows $w_{n\_pa}$, for each of which the processor 102 will determine the percent activity. For example, if the portion of the signal 300 being considered is one minute long and $w_n$=600 (i.e., window duration of 0.1 s), then $w_{n\_pa}$ may be set to 30 (i.e., window duration of 2 s).
2. For each of the percent activity windows, the processor 102 determines what percent of the event threshold windows satisfy those thresholds that define the event. For example, if $w_n$=600 and $w_{n\_pa}$=30, then each of the percent activity windows comprises 20 event threshold windows. If an event, such as a leak, is defined by each of RMS value, frequency centroid, filtered baseline, harmonic power, and PSD flux satisfying certain thresholds, then the processor 102 determines the event has occurred for an event threshold window if all the thresholds for RMS value, frequency centroid, filtered baseline, harmonic power, and PSD flux are satisfied; otherwise, the processor 102 determines that the event has not occurred for that event threshold window.

3. For each of the percent activity windows, the processor 102 determines the percent activity by dividing the number of event threshold windows for which the processor 102 determines an event has occurred by the total number of event threshold windows in that percent activity window. When the percentage of event threshold windows for which the processor 102 determines an event has occurred exceeds an activity threshold, the processor 102 determines that the event corresponding to the event threshold has occurred.

While in one example embodiment the event parameters used in Table 1 are used to determine percent activity, in different embodiments (not depicted) different parameters may be used. Additionally, while in the above example embodiment all of the event threshold windows are of identical duration and all of the percent activity windows are of identical duration, in different embodiments this need not be the case.

Graphical User Interface

Figure 6:
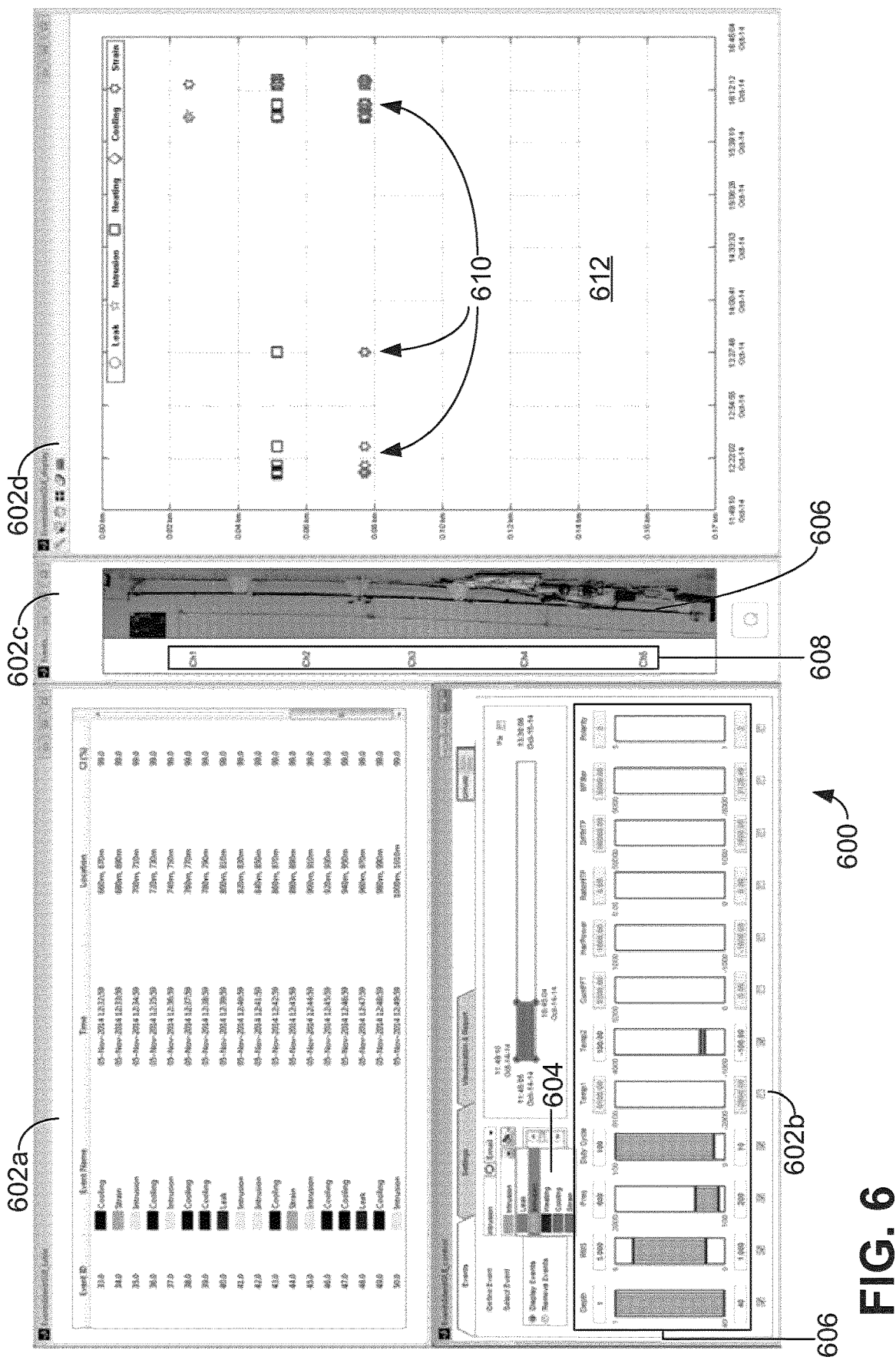
FIG. 6 shows an example graphical user interface ("GUI") used by the system of FIG. 1A.

Referring now to FIG. 6, there is shown a GUI 600 that the signal processing device 118 displays to an operator of the system 100. The operator may interact with the device 118 via the input device 110, which may comprise, for example, a keyboard, mouse, touchscreen, or other type of input device. The GUI 600 is used to define events; that is, to define which one or more parameters at which one or more thresholds are indicative of one or more events having occurred.

The GUI 600 comprises four windows 602a-d: an event identification window 602a; an event definition window 602b, an asset view window 602c, and an event graph window 602d. The event identification window 602a comprises five columns, which in FIG. 6 from left to right are columns that show a numeric event identifier, the name of the event, the time the event occurred, the location of the event, and the confidence interval of the event.

The event definition window 602b comprises a drop down menu 604 of the different types of events that the system 100 may be used to identify; in the example embodiment of FIG. 6, these events are a pipeline leak, pipeline intrusion/third party interference, heating, cooling, and pipeline strain that exceeds a certain threshold. In the context of a pipeline, examples of third party interference include hot tapping and an individual digging too near to the pipeline. In different embodiments (not depicted) the system 100 may be used to additionally or alternatively monitor different events. The event definition window 602b also comprises a group of sliders 606 that allows the operator of the system 100 to define the thresholds that the parameters are to meet before the processor 102 indicates that an event has occurred. For example, the depicted group of sliders 606 shows frequency centroid ("Freq" in FIG. 6), RMS value ("RMS" in FIG. 6), percent activity ("Duty Cycle" in FIG. 6), harmonic power ("HarPower" in FIG. 6), and PSD flux ("DiffHTP" in FIG. 6). The group of sliders 606 also includes event parameters in the form of depth ("Depth" in FIG. 6) and temperature ("Temp1" and "Temp2" in FIG. 6).

Table 2, below, is an example of the various parameter thresholds that the processor 102 may use when determining whether an event has occurred. The information shown in Table 2 may be stored in the form of a look-up table in the computer readable medium 104 and accessed by the processor 102 as desired:

TABLE 2

Example Thresholds for Event Parameters Used for Event Identification

| Parameter | | Threshold of Event | | | | |
|---|---|---|---|---|---|---|
| | | Heating | Cooling | Strain | Intrusion | Leak |
| RMS | Low | 0 | 0 | 0 | 1 | 0.3 |
| | High | 0.03 | 0.03 | 0.5 | 5 | 1 |
| Frequency | Low | 500 | 500 | 150 | 200 | 800 |
| | High | 1000 | 1000 | 700 | 600 | 1300 |
| Filtered | Low | −300 | 100 | 550 | −100 | 60 |
| Baseline | High | −100 | 300 | 3000 | 100 | 250 |
| % activity | Low | 50 | 50 | 5 | 10 | 20 |
| | High | 100 | 100 | 100 | 100 | 100 |
| PSD Flux | Low | 0 | 0 | 0 | $10^{-3}$ | $2 \times 10^{-6}$ |
| | High | $10^{-10}$ | $10^{-10}$ | $10^{-8}$ | $4.5 \times 10^{-3}$ | $11 \times 10^{-6}$ |

The "heating" and "cooling" events are examples of thermal events in which the dynamic strain measurements result from thermal changes measured by the fiber 112. The "leak" event means the dynamic strain measurements result from a leak in a pipeline. The "intrusion" event means the dynamic strain measurements result from an intrusion of a physical object into the pipeline through the pipeline's wall. The "strain" event means the dynamic strain measurements result from strain not caused by a thermal event and that has not caused a perforation in the pipeline's wall, as occurs with intrusion or leak events.

The asset view window 602c depicts the asset, such as a pipeline or wellbore, that the system 100 is monitoring and how different portions of the asset map to different sensing regions of the system 100. In FIG. 6 the asset is a pipeline 606 and is displayed as a picture in the asset view window 602c, while the different sensing regions are labeled using channel labels 608 as channels 1 through 5. Each channel represents the fiber segment 116 extending between a pair of FBGs 114 and, as discussed above in respect of FIGS. 1A-1C, accordingly corresponds to a fiber segment 116 that the system 100 can monitor. Each of the channel labels 608 is located adjacent to the portion of the pipeline 606 monitored by that channel, permitting the operator of the system 100 to intuitively understand which portion of the pipeline 600 corresponds to which of the channels.

The event graph window 602d graphically depicts when and where various events have occurred. The event graph window 602d comprises a graph 612 whose y-axis is position along the pipeline 606 and whose x-axis is time. The graph 612 comprises a variety of markers 610, with a different marker used for each of the different events that the system 100 can monitor (in the depicted embodiment, leak, intrusion, heating, cooling, and strain). The y-axis of the graph 612 is aligned with the pipeline 606 as depicted in the asset view window 602c such that the markers 610 on the graph 612 are aligned with the location on the pipeline 606 at which the events identified by the markers 610 occurred. Aligning the channel labels 608, the pipeline 606, and the markers 610 permits the operator of the system 100 to quickly and intuitively be able to understand which event has occurred, where the event occurred on the pipeline 606, and what sensing region of the system 100 was used to detect the event.

While in FIG. 6 the asset shown in the asset view window 602c is the pipeline 606, in different embodiments (not depicted) the system 100 may be used to monitor different assets such as wellbores, railways, water pipes, security perimeters (e.g., fences, walls), bridges (e.g., for strain monitoring), and subsea risers (e.g., for strain and leak monitoring). Furthermore, while the GUI 600 shows only one asset being monitored at any one time, in different embodiments (not depicted) the system 100 may be used to monitor multiple assets simultaneously. For example, several pipelines 606 may be displayed in the asset view window 602c with each of the pipelines 606 being arranged parallel to each other. The pipelines 606 may be adjacent to the y-axis of the graph 612, with different markers 610 being used to distinguish between the events that have occurred on the different pipelines 606.

In the depicted embodiment and as discussed above in respect of Table 2, the same event thresholds are used for all of the different channels. However, in different embodiments (not depicted), the processor 102 may access different lookup tables containing different event thresholds depending on the channel of the fiber 112 being monitored. For example, in an embodiment in which the asset being monitored is a pipeline and the pipeline extends under a road, under a field, and near heavy equipment, three different lookup tables may be stored in the computer readable medium 104 containing event thresholds specific to those three different operating conditions. For example, the lookup table for the channel nearest the heavy equipment may have a relatively high threshold (compared to the lookup tables for the other channels) for harmonic power, as harmonics may be indicative of machinery in operation. Similarly, the lookup table for the channel under the field may use the lowest event thresholds given the relatively little disturbance that portion of the pipeline typically experiences. Additionally, in certain embodiments, different lookup tables may be used for different seasons and different operational modes.

The embodiments have been described above with reference to flowcharts and block diagrams of methods, apparatuses, systems, and computer program products. In this regard, the flowchart and block diagram in FIG. 2 illustrates the architecture, functionality, and operation of possible implementations of various embodiments. For instance, each block of the flowcharts and block diagrams may represent a module, segment, or portion of code, which comprises one or more executable instructions for implementing the specified logical function(s). In some different embodiments, the functions noted in that block may occur out of the order noted in those figures. For example, two blocks shown in succession may, in some embodiments, be executed substantially concurrently, or the blocks may sometimes be executed in the reverse order, depending upon the functionality involved. Some specific examples of the foregoing have been noted above but those noted examples are not necessarily the only examples. Each block of the block diagrams and flowcharts, and combinations of those blocks, may be implemented by special purpose hardware-based systems that perform the specified functions or acts, or combinations of special purpose hardware and computer instructions.

Each block of the flowcharts and block diagrams and combinations thereof can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the blocks of the flowcharts and block diagrams.

These computer program instructions may also be stored in a computer readable medium that can direct a computer, other programmable data processing apparatus, or other devices to function in a particular manner, such that the instructions stored in the computer readable medium produce an article of manufacture including instructions that implement the function or act specified in the blocks of the flowcharts and block diagrams. The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions or acts specified in the blocks of the flowcharts and block diagrams.

The term "computer system", as used herein, is not limited to any particular type of computer system and encompasses servers, desktop computers, laptop computers, networked mobile wireless telecommunication computing devices such as smartphones, tablet computers, as well as other types of computer systems.

As will be appreciated by one skilled in the art, embodiments of the technology described herein may be embodied as a system, method, or computer program product. Accordingly, these embodiments may take the form of an entirely hardware embodiment, an entirely software embodiment (including firmware, resident software, micro-code, etc.) or an embodiment combining software and hardware that may all generally be referred to herein as a "circuit," "module," or "system." Furthermore, embodiments of the presently described technology may take the form of a computer program product embodied in one or more non-transitory computer readable media having stored or encoded thereon computer readable program code.

Where aspects of the technology described herein are implemented as a computer program product, any combination of one or more computer readable media may be utilized. A computer readable medium may comprise a computer readable signal medium or a non-transitory computer readable medium used for storage. A non-transitory computer readable medium may comprise, for example, an electronic, magnetic, optical, electromagnetic, infrared, or semiconductor system, apparatus, or device, or any suitable combination thereof. Additional examples of non-transitory computer readable media comprise a portable computer diskette, a hard disk, RAM, ROM, an erasable programmable read-only memory (EPROM or flash memory), a portable compact disc read-only memory (CD-ROM), an optical storage device, a magnetic storage device, or any suitable combination thereof. As used herein, a non-transitory computer readable medium may comprise any tangible medium that can contain, store, or have encoded thereon a program for use by or in connection with an instruction execution system, apparatus, or device. Thus, computer readable program code for implementing aspects of the embodiments described herein may be contained, stored, or encoded on the computer readable medium 104 of the signal processing device 118.

A computer readable signal medium may comprise a propagated data signal with computer readable program code embodied therein, for example, in baseband or as part of a carrier wave. That propagated signal may take any of a variety of forms such as electro-magnetic, optical, or any suitable combination thereof. A computer readable signal medium may be any computer readable medium that is not a non-transitory computer readable medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination thereof. Computer program code for carrying out operations comprising part of the embodiments described herein may be written in any combination of one or more programming languages, including an object oriented programming language and procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

One or more example embodiments have been described by way of illustration only. This description is been presented for purposes of illustration and description, but is not intended to be exhaustive or limited to the form disclosed. Many modifications and variations will be apparent to those of ordinary skill in the art without departing from the scope of the claims. It will be apparent to persons skilled in the art that a number of variations and modifications can be made without departing from the scope of the claims. In construing the claims, it is to be understood that the use of a computer to implement the embodiments described herein is essential at least where the presence or use of computer equipment is positively recited in the claims.

The invention claimed is:

1. A method for determining whether an event has occurred from dynamic strain measurements, the method comprising:
   (a) determining, using a processor, at least one event parameter from a signal representing the dynamic strain measurements, wherein the at least one event parameter is selected from the group comprising a measure of magnitude of the signal, frequency centroid of the signal, filtered baseline of the signal, harmonic power of the signal, and time-integrated spectrum flux of the signal;
   (b) using the at least one event parameter, using the processor to determine whether the event has occurred; and
   (c) dividing the signal into event threshold windows, wherein determining the at least one event parameter is performed on a per event threshold window basis.

2. The method of claim 1 wherein the event is selected from the group comprising a leak in a conduit, a pipeline intrusion, a strain event, and a thermal event.

3. The method of claim 1 further comprising obtaining the signal by optically interrogating an optical fiber comprising a pair of fiber Bragg gratings tuned to substantially identical center wavelengths, wherein the dynamic strain measurements comprise a strain measurement obtained along a fiber segment between the pair of fiber Bragg gratings.

4. The method of claim 1 wherein the measure of magnitude of the signal is the root-mean-square ("RMS") value of the signal, and wherein the processor determines the RMS value as $\sqrt{x_1^2+x_2^2+x_3^2+...+x_N^2}$, wherein the event threshold window comprises N samples of the signal, $x_n$ is the magnitude at sample n, and $1 \leq n \leq N$.

5. The method of claim 1 wherein the processor determines the frequency centroid as $$\frac{\sum_{n=0}^{N-1} f_n \cdot x_n}{\sum_{n=0}^{N-1} x_n},$$

wherein $f_n$ is the frequency of the signal at sample n, $x_n$ is the magnitude of the frequency component at sample n, and the event threshold window comprises N samples of the signal.

6. The method of claim 5 wherein the processor determines multiple frequency centroids for each of the event threshold windows, wherein each of the frequency centroids is determined for a different frequency band.

7. The method of claim 1 wherein the processor determines the filtered baseline for each of the event threshold windows by:
   (a) filtering a first portion of the signal contained within the event threshold window to generate a filtered portion of the signal; and
   (b) averaging the filtered portion of the signal over time.

8. The method of claim 7 wherein the first portion of the signal is all of the signal contained within the event threshold window, and wherein the time over which the first filtered portion is averaged is the duration of the event threshold window.

9. The method of claim 7 wherein the processor filters the first portion of the signal using a bandpass filter having a passband of between approximately 0.001 Hz and approximately 10 Hz.

10. The method of claim 7 wherein the processor filters the first portion of the signal using a bandpass filter having a passband of between approximately 10 Hz and approximately 20 Hz.

11. The method of claim 1 wherein the processor determines the harmonic power for each of the event threshold windows by:
   (a) determining a first frequency domain representation of a second portion of the signal contained within the event threshold window to generate a first frequency domain representation of the signal;
   (b) identifying a first set of peaks in the first frequency domain representation of the signal;
   (c) identifying a second set of peaks in the first frequency domain representation of the signal, wherein the peaks comprising the second set are a subset of the first set and are integer multiples of each other; and
   (d) summing total power of the second set of peaks to determine the harmonic power identified by the frequency of the peak of the second set having the lowest frequency.

12. The method of claim 11 wherein the processor identifies as the first set of peaks all peaks in the first frequency domain representation of the signal.

13. The method of claim 11 wherein the processor identifies as the first set of peaks only sharp peaks in the first frequency domain representation of the signal, wherein the processor determines whether a peak at a particular frequency is a sharp peak by:
   (a) determining a magnitude of the peak at the particular frequency;
   (b) determining an average value of frequency magnitudes at one or more neighboring frequencies;
   (c) comparing the magnitude of the peak at the particular frequency to the average value of frequency magnitudes; and
   (d) identifying the peak at the particular frequency as a sharp peak when the magnitude of the peak at the particular frequency exceeds the average value of frequency magnitudes by a sharp peak threshold.

14. The method of claim 13 wherein the neighboring frequencies symmetrically surround the particular frequency.

15. The method of claim 11 wherein the processor identifies as the first set of peaks a subset of all peaks in the first frequency domain representation of the signal, the subset comprising the N most powerful peaks, where N is less than a total number of the peaks in the first set.

16. The method of claim 11 further comprising, prior to identifying the first or second set of peaks, using the processor to apply a moving average or median filter to smooth the signal.

17. The method of claim 1 wherein the processor determines the time-integrated spectral flux for each of the event windows by:
   (a) determining a second frequency domain representation of a third portion of the signal contained within the event threshold window to generate a second frequency domain representation of the signal;
   (b) identifying N most powerful harmonics in the second frequency domain representation, wherein N is an integer less than a total number of harmonics in the PSD representation;
   (c) removing the N most power harmonics in the second frequency domain representation of the signal to generate a post-harmonic frequency domain representation; and
   (d) determining the time-integrated spectral flux as a summation of a spectral flux of the post-harmonic frequency domain representation.

18. The method of claim 17 wherein the processor determines the post-harmonic frequency domain representation as $F_i = \sum_{j=1}^{N}(P_{ij} - P_{ij-1})^2$, wherein each of the event threshold windows is divided into time slices and, for any one of the event threshold windows, i represents each of the time slices, $F_i$ is the flux of the $i^{th}$ time splice, and $P_i$ and $P_{i-1}$ represent the power spectral density vectors of the $i^{th}$ and i−1 time slices, N represents a number of frequency bands over which the flux is determined.

19. The method of claim 18 wherein $$N = \frac{f_{max} - f_{min}}{\Delta f},$$

$f_{max}$ is at most the maximum frequency present in a Fourier Transform of the signal, $f_{min}$ is at lowest a minimum frequency present in the Fourier Transform of the signal, and $\Delta f$ is a frequency resolution used to determine vectors of the second frequency domain representation.

20. The method of claim 1 wherein the processor determines whether the event has occurred by:
   (a) for each of the event threshold windows, comparing each of the at least one event parameter to an event parameter threshold specific to each of the at least one event parameter;
   (b) determining a percent activity for each of an event parameter window comprising at least one of the event threshold windows, wherein the percent activity is a percentage of the event threshold windows in the event parameter window for which each of the at least one event parameters satisfies the event parameter threshold;
   (c) comparing the percent activity to an activity threshold; and
   (d) when the percent activity satisfies the activity threshold, determining that the event has occurred for the portion of the signal in the event parameter window.

21. A system for determining whether an event has occurred from dynamic strain measurements, the system comprising:
   (a) an optical fiber comprising a pair of fiber Bragg gratings tuned to substantially identical center wavelengths, wherein the dynamic strain measurements comprise a strain measurement obtained along a fiber segment between the pair of fiber Bragg gratings;
   (b) an optical interrogator optically coupled to the optical fiber and configured to optically interrogate the fiber Bragg gratings and to output an electrical signal representing the dynamic strain measurements; and
   (c) a signal processing unit comprising:
      (i) a processor communicatively coupled to the optical interrogator; and
      (ii) a non-transitory computer readable medium communicatively coupled to the processor, wherein the medium has program code stored thereon that is executable by the processor and that, when executed by the processor, causes the processor to perform a method for determining whether an event has occurred from dynamic strain measurements, the method comprising:
(1) determining, using a processor, at least one event parameter from a signal representing the dynamic strain measurements, wherein the at least one event parameter is selected from the group comprising a measure of magnitude of the signal, frequency centroid of the signal, filtered baseline of the signal, harmonic power of the signal, and time-integrated spectrum flux of the signal;
(2) using the at least one event parameter, using the processor to determine whether the event has occurred; and
(3) dividing the signal into event threshold windows, wherein determining the at least one event parameter is performed on a per event threshold window basis.

22. The system of claim 21 further comprising a display communicatively coupled to the processor, wherein the program code further causes the processor to display, on the display, an indication of whether the event has occurred.

23. A non-transitory computer readable medium having encoded thereon program code that is executable by a processor and that, when executed by the processor, causes the processor to perform a method for determining whether an event has occurred from dynamic strain measurements, the method comprising:
(a) determining, using a processor, at least one event parameter from a signal representing the dynamic strain measurements, wherein the at least one event parameter is selected from the group comprising a measure of magnitude of the signal, frequency centroid of the signal, filtered baseline of the signal, harmonic power of the signal, and time-integrated spectrum flux of the signal;
(b) using the at least one event parameter, using the processor to determine whether the event has occurred; and
(c) dividing the signal into event threshold windows, wherein determining the at least one event parameter is performed on a per event threshold window basis.

* * * * *